(12) United States Patent
Miansian

(10) Patent No.: US 7,882,877 B2
(45) Date of Patent: Feb. 8, 2011

(54) COMBINATION WHEEL AND VALVE ASSEMBLY

(76) Inventor: James K. Miansian, P.O. Box 1600, Lake Forest, CA (US) 92609

( * ) Notice: Subject to any disclaimer, the term of this patent is extended or adjusted under 35 U.S.C. 154(b) by 45 days.

(21) Appl. No.: 12/236,460

(22) Filed: Sep. 23, 2008

(65) Prior Publication Data

US 2009/0039696 A1 Feb. 12, 2009

Related U.S. Application Data

(63) Continuation-in-part of application No. 11/274,891, filed on Nov. 15, 2005, now Pat. No. 7,427,110, which is a continuation-in-part of application No. 10/942,511, filed on Sep. 16, 2004, now Pat. No. 6,964,454.

(51) Int. Cl.
*B60B 25/22* (2006.01)

(52) U.S. Cl. ............. 152/427; 301/64.101; 301/64.304; 301/67

(58) Field of Classification Search ................ 152/415, 152/416, 417, 418, 419, 421, 422, 427, 428; 301/5.24, 10.1, 11.1, 12.1, 64.201, 64.202, 301/64.203, 64.301, 64.302, 64.303, 64.304, 301/64.305, 64.306, 64.101, 64.107, 67, 301/70, 73, 79

See application file for complete search history.

(56) References Cited

U.S. PATENT DOCUMENTS

| 478,394 | A | | 7/1892 | Bretz |
|---|---|---|---|---|
| 496,844 | A | | 5/1893 | Baker |
| 1,415,427 | A | * | 5/1922 | Betzell .................. 301/64.303 |
| 1,428,241 | A | * | 9/1922 | Kercher ....................... 152/405 |
| 1,525,171 | A | * | 2/1925 | Dodds .................... 301/64.201 |
| 1,555,048 | A | * | 9/1925 | Williams .................... 152/427 |
| 1,718,169 | A | | 6/1929 | Meldrum |
| 1,721,725 | A | * | 7/1929 | Baker ........................... 152/375 |
| 2,066,729 | A | * | 1/1937 | Hobb ........................... 152/405 |
| 2,405,954 | A | * | 8/1946 | Hollerith ................... 152/381.3 |
| 2,741,047 | A | | 4/1956 | Pollock |
| 2,778,690 | A | | 1/1957 | Horling |
| 2,871,905 | A | * | 2/1959 | Stanton ...................... 152/404 |
| 2,948,055 | A | * | 8/1960 | Baxter et al. ............. 29/894.31 |
| 3,582,141 | A | * | 6/1971 | Kelsey, Jr. ................. 301/95.11 |

(Continued)

FOREIGN PATENT DOCUMENTS

JP 63297110 A * 12/1988

*Primary Examiner*—Russell D Stormer
(74) *Attorney, Agent, or Firm*—Eric Karich

(57) ABSTRACT

A combination wheel and valve assembly has a plurality of spokes each having at least one aperture through a rim-end thereof. A rim has an inner surface and a spoke mating element opposite the inner surface. A plurality of through-holes extend through the spoke mating element of the rim. A plurality of bolts are shaped to fit through the aperture of the rim-end of each of the spokes, and into one of the plurality of through-holes of the spoke mating element, to fasten each spoke to the rim. A conduit extends through the inner surface of the rim to one of the through-holes of the rim, such that a valve assembly can extend through the aperture of one of the spokes and engage the through-hole having the conduit, thereby enabling fluid flow through the valve assembly and the conduit to the inner surface of the rim.

2 Claims, 11 Drawing Sheets

U.S. PATENT DOCUMENTS

| | | | |
|---|---|---|---|
| 3,991,804 A * | 11/1976 | Wilson | 152/427 |
| 4,106,543 A * | 8/1978 | Sano | 152/405 |
| 4,319,785 A * | 3/1982 | Sato et al. | 301/6.3 |
| 4,448,456 A | 5/1984 | Pfundstein | |
| 4,618,187 A | 10/1986 | Watanabe | |
| 5,290,094 A | 3/1994 | Gragg | |
| 5,494,337 A | 2/1996 | Behnke | |
| D373,102 S | 8/1996 | Choi | |
| 5,806,935 A | 9/1998 | Shemeister | |
| 6,474,383 B1 * | 11/2002 | Howald et al. | 152/418 |
| 6,637,830 B1 | 10/2003 | Burgess | |
| 6,655,748 B2 * | 12/2003 | Coleman et al. | 301/64.101 |
| 6,899,400 B1 | 5/2005 | Cook | |
| 6,942,303 B2 | 9/2005 | Smith et al. | |
| 6,964,454 B1 | 11/2005 | Miansian | |
| 7,086,706 B1 | 8/2006 | Wood | |
| 7,175,240 B2 | 2/2007 | Fultz et al. | |
| 7,213,888 B2 | 5/2007 | Simpson | |
| 7,458,648 B2 * | 12/2008 | Esposito et al. | 301/65 |
| 2004/0195902 A1 * | 10/2004 | Hamada | 301/10.1 |
| 2006/0055230 A1 | 3/2006 | Raddin et al. | |
| 2006/0087171 A1 | 4/2006 | Riley et al. | |

* cited by examiner

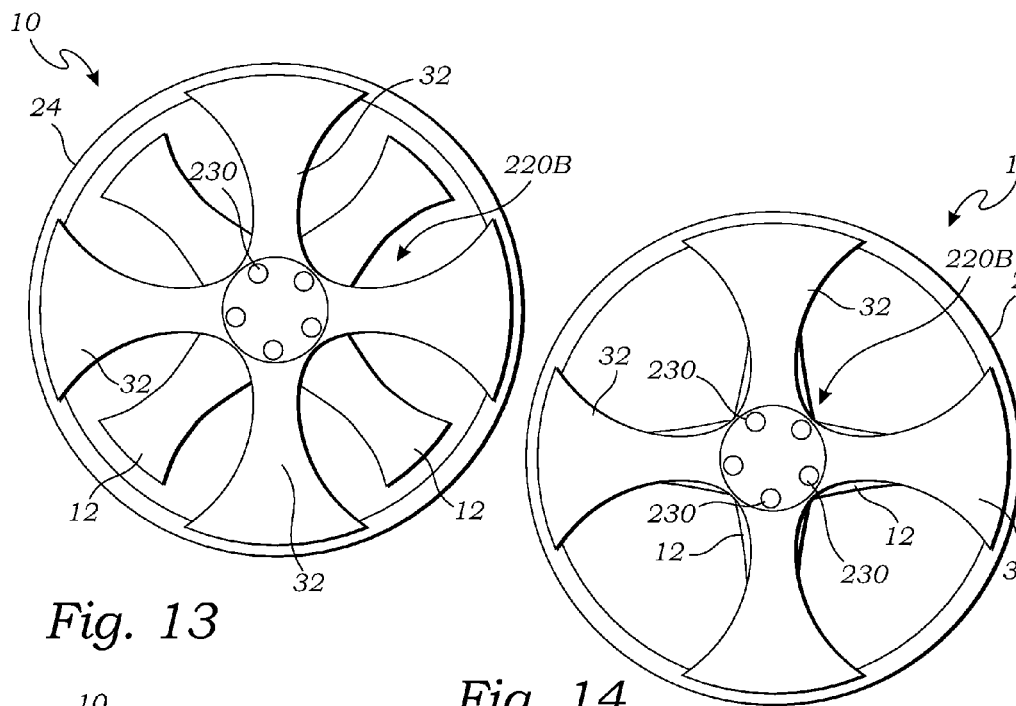
Fig. 13
Fig. 14
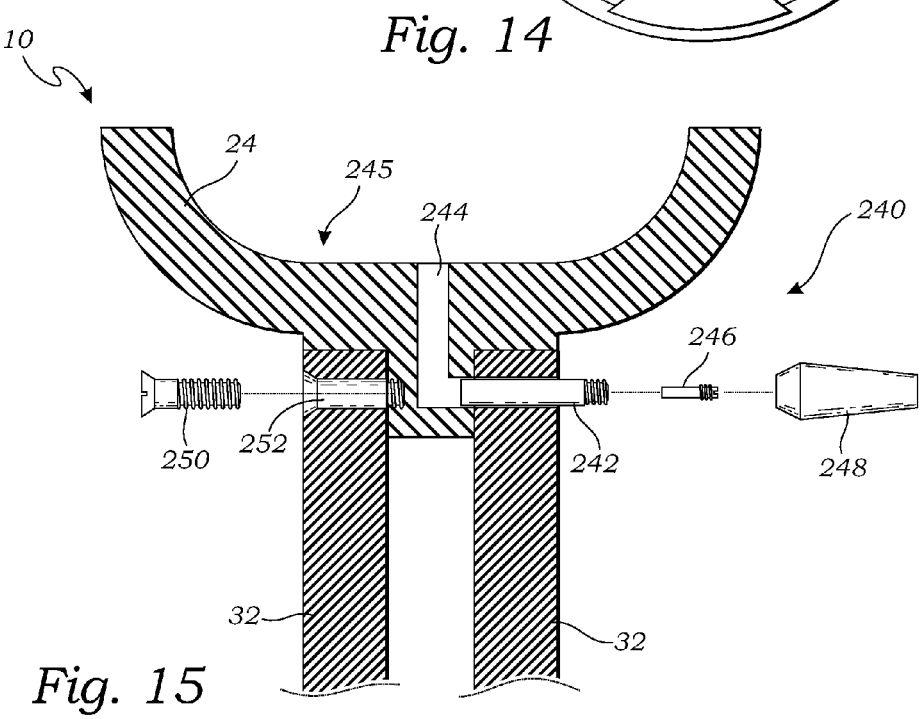
Fig. 15

COMBINATION WHEEL AND VALVE ASSEMBLY

CROSS-REFERENCE TO RELATED APPLICATIONS

This application for a utility patent is a continuation-in-part of previously filed utility patent application Ser. No. 11/274,891, filed Nov. 15, 2005, now U.S. Pat. No. 7,427,110, which was a continuation-in-part of previously filed utility patent application Ser. No. 10/942,511, filed Sep. 16, 2004, now U.S. Pat. No. 6,964,454.

STATEMENT REGARDING FEDERALLY SPONSORED RESEARCH

Not Applicable

BACKGROUND OF THE INVENTION

1. Field of the Invention

This invention relates generally to wheels, and more particularly to a combination wheel and valve assembly that enables easier installation of a valve assembly in a custom wheel.

2. Description of Related Art

Wheels and wheel covers have been developed with spinning ornamental components (i.e., spinners) that rotate independent of the wheels. Such wheels and wheel covers provide observers with attention-getting illusions. For example, when a vehicle with such wheels or wheel covers is moving and the wheels are rotating, the spinners may be rotating very slowly or not at all, providing observers with the illusion that the wheels are rotating slowly or not at all. Further, when the vehicle comes to a stop and the wheels stop rotating, the spinners may continue to rotate, providing observers with the illusion that the wheels are still rotating.

Examples of spinners include the following: Fitzgerald, U.S. Pat. No. 6,663,187, teaches a free wheeling spinner mountable on a wheel by means of an adapter for accommodating wheels with similar bolt patterns and varying diameters. The spinner is mounted to the adapter by means of a bearing of inner and outer races secured respectively to the adapter and the spinner. Elongated lug nuts having a threaded free end receive bolts for securing the adapter to the automobile wheel.

Fowlkes, U.S. Pat. No. 6,554,370, teaches a wheel spinner assembly that is mountable onto a corresponding wheel of a vehicle. The assembly includes a wheel mount supportable by the wheel. A spinner mount is connected to the wheel mount. A bearing assembly is supported by the spinner mount. A spinner is supported by the bearing assembly, wherein the bearing assembly allows the spinner to rotate independently relative to the corresponding wheel as the vehicle is in motion.

Other patents of interest include Marshall, U.S. Pat. No. 3,722,958, Gragg, U.S. Pat. No. 5,290,094, Butler, Jr., U.S. Pat. No. 3,005,906, Green, U.S. Pat. No. 5,222,785, Lees, U.S. Pat. No. 6,264,284, and Russell, U.S. Pat. No. 6,030,049.

SUMMARY OF THE INVENTION

The present invention teaches certain benefits in construction and use which give rise to the objectives described below.

The present invention provides a combination wheel and valve assembly that includes a plurality of spokes each having at least one aperture through a rim-end thereof; a rim having an inner surface and a spoke mating element opposite the inner surface; a plurality of through-holes extending through the spoke mating element of the rim, the plurality of through-holes being spaced around the rim; a plurality of bolts shaped to fit through the aperture of the rim-end of each of the spokes, and into one of the plurality of through-holes of the spoke mating element, to fasten each spoke to the rim; a conduit extending through the inner surface of the rim to one of the through-holes of the rim; and a valve assembly shaped to extend through the aperture of one of the spokes and engage the through-hole having the conduit, thereby enabling fluid flow through the valve assembly, and the conduit, to the inner surface of the rim.

A primary objective of the present invention is to provide a combination wheel and valve assembly having advantages not taught by the prior art.

Another objective is to provide a combination wheel and valve assembly that facilitates installation of a valve assembly in a custom wheel.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings:

FIG. 13 is a side elevational view of the spinner locking mechanism being used to lock the center spinner in a first position, wherein the spinner is positioned between the side supports;

FIG. 14 is a side elevational view of the spinner locking mechanism being used to lock the center spinner in a second position, wherein the spinner is positioned behind the side supports;

FIG. 15 is a sectional view similar to FIG. 7, illustrating a valve assembly that is adapted to be positioned through the rim;

DETAILED DESCRIPTION OF THE INVENTION

Figure 1:
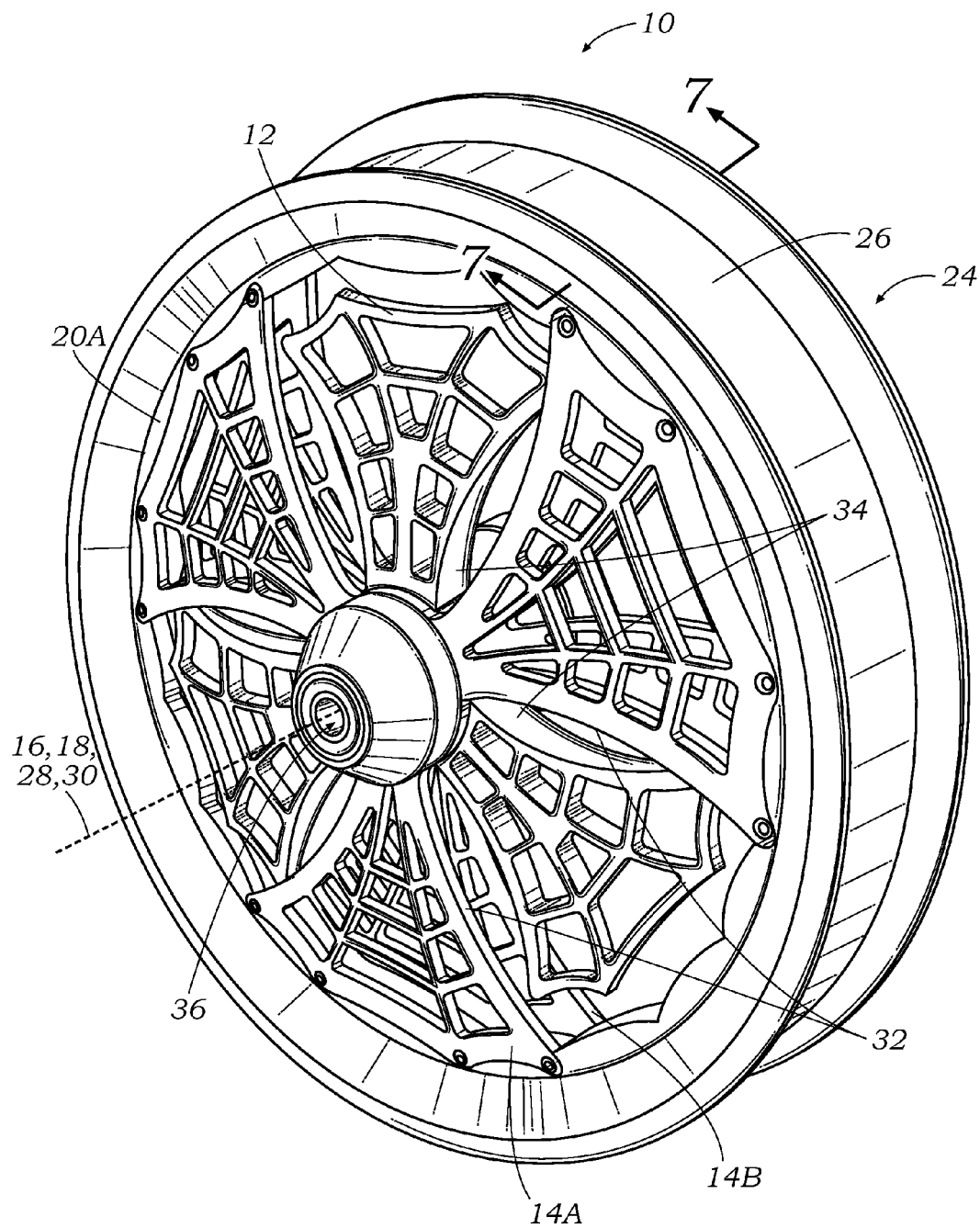
FIG. 1 is a perspective view of one embodiment of a wheel having a spinner assembly rotatably mounted between a pair of supports.
Figure 7:
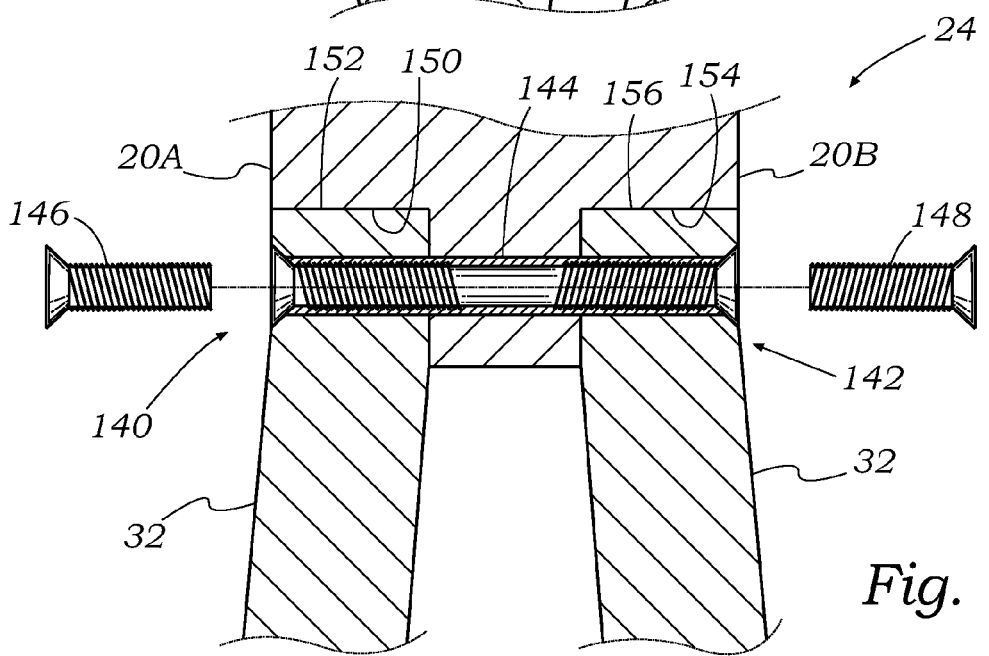
FIG. 7 is a sectional view of a portion of the wheel of FIG. 1 as indicated by lines 7-7 in FIG. 1, illustrating a mechanism used to connect spokes of supports to respective side surfaces of a rim, wherein the mechanism includes an internally threaded tube and a pair of bolts.

FIG. 1 is a perspective view of one embodiment of a wheel 10 having a spinner assembly 12 rotatably mounted between a pair of supports 14A and 14B. The first support 14A has a first axis 16, and the second support 14B has a second axis 18. The first support 14A is connected to a side surface 20A of a rim 24. An opposed side surface 20B, shown in FIG. 7, is connected to the second support 14B. The rim 24 has an outer surface 26 adapted to receive a tire (not shown). The rim 24 has a third axis 28, and the spinner assembly 12 has a fourth axis 30. As indicated in FIG. 1, the spinner assembly 12 is rotatably mounted between the first and second supports 14A and 14B such that the axes 16 and 18 of the respective supports 14A and 14B, the axis 28 of the rim 24, and the axis 30 of the spinner assembly 12 are all aligned.

The first support 14A is visible in FIG. 1, and in the embodiment of FIG. 1 the second support 14B is substantially identical. In general, the first support 14A has a central hub portion and a spanning portion extending from the hub portion, wherein the spanning portion is adapted for connection to the side surface 20A of the rim 24. In the embodiment of FIG. 1 the spanning portion of the first support 14A includes multiple spokes 32, wherein each of the spokes 32 is adapted for connection to the side surface 20A of the rim 24.

While this structure illustrates one embodiment of the wheel 10, those skilled in the art will recognize that the first and second supports 14A and 14B could have a wide variety of structures and still remain within the scope of the present invention, as claimed. The first and second supports 14A and 14B are not required to be identical, and they are not required to have any particular structure, except as required for the structural stability of the wheel 10. A wide variety of shapes, designs, or other features could be incorporated without deviating from the invention as claimed.

In general, the spinner assembly includes a central hub portion and a decorative portion extending from the hub portion. In the embodiment of FIG. 1, the decorative portion may include multiple arms 34, wherein each of the arms 34 resembles one of the spokes 32. However, as with the first and second supports 14A and 14B described above, the decorative portion could include any number of shapes, designs, or other features that enhance the ornamental design of the wheel 10.

In general, the spinner assembly 12 rotates about the axis 30 independent of other components of the wheel 10. When a vehicle including the wheel 10 is moving and the rim 24 and the connected supports 14A and 14B are rotating, the spinner assembly 12 may be rotating very slowly or not at all; further, when the vehicle comes to a stop and the rim 24 and the connected supports 14A and 14B are not rotating, the spinner assembly 12 may continue to rotate. The contrast between the rates of rotation of the spinner assembly 12 and the rim 24 and the connected supports 14A and 14B, provides a unique visual effect.

In the embodiment of FIG. 1, the wheel 10 has a hole 36 extending through a central portion of the wheel 10 and dimensioned to receive an axle rod (not shown) of a vehicle. As a result, the wheel 10 of FIG. 1 is particularly suited for use on vehicles wherein wheels are attached via axle rods (e.g., motorcycles). As indicated in FIG. 1, the aligned axes 16 and 18 of the respective supports 14A and 14B, 28 of the rim 24, and 30 of the spinner assembly 12 pass through the hole 36. While one particular embodiment of the wheel 10 is shown, those skilled in the art will recognize that the wheel 10 can be adapted to almost any wheeled vehicle, including but not limited to cars, scooters, golf carts, skateboards, or indeed any form of wheeled vehicle.

Figure 2:
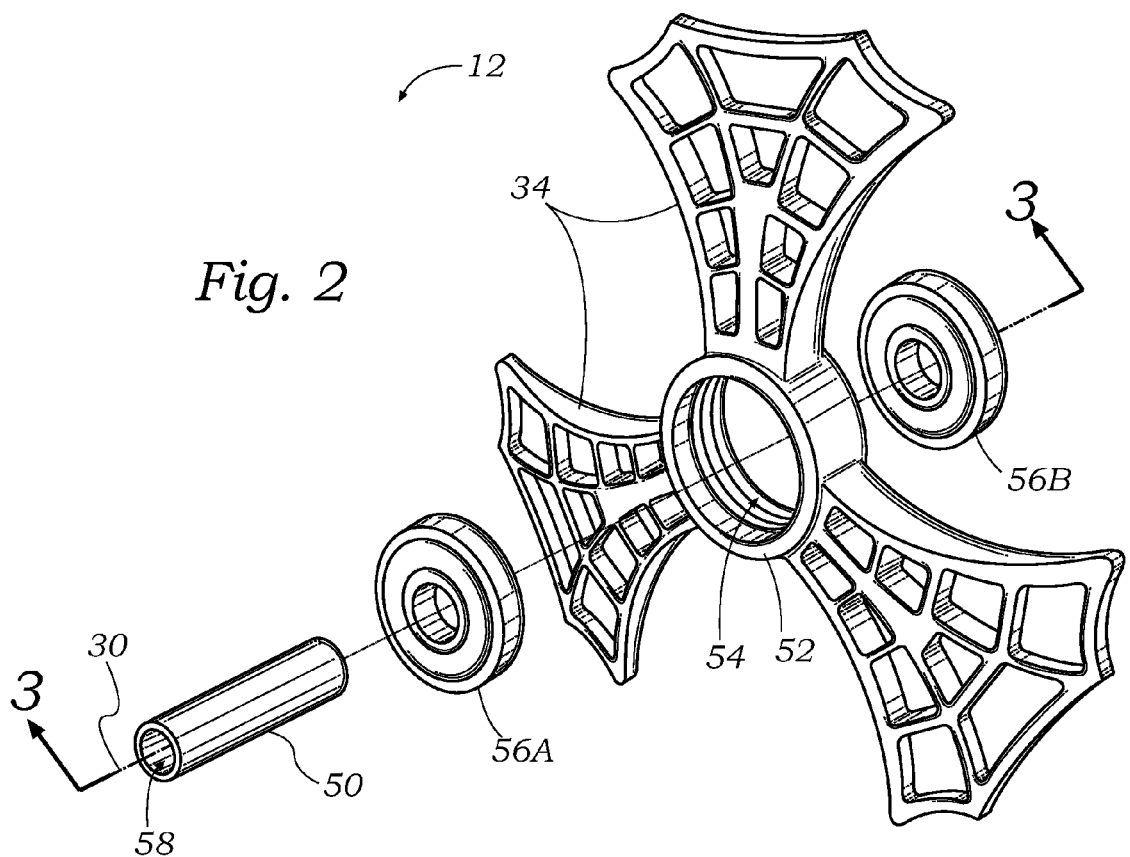
FIG. 2 is an exploded view of one embodiment of the spinner assembly of FIG. 1 and an associated tube of the wheel of FIG. 1.

FIG. 2 is an exploded view of one embodiment of the spinner assembly 12 of FIG. 1 and an associated tube 50 of the wheel 10 of FIG. 1. A central hub portion 52 of the spinner assembly 12 has a central aperture 54 that is adapted to receive a pair of ball bearings 56A and 56B. A decorative portion, in this embodiment the multiple arms 34, extends radially outward from the hub portion 52. The tube 50 has a central opening 58 dimensioned to receive the axle rod. The tube 50 has a predetermined length and functions as a spacer, and also keeps various components of the wheel 10 of FIG. 1 in alignment. Each of the ball bearings 56A and 56B has a central opening, and in assembly the tube 50 passes through the central openings in each of the ball bearings 56A and 56B. (See FIG. 3.)

It is noted that although bearings 56A and 56B are ball bearings in the embodiment of FIG. 2, other types of bearings may also be used. Further, although the embodiment of FIG. 2 includes a pair of ball bearings 56A and 56B, other embodiments of the spinner assembly 12 may have a single bearing, or more than 2 bearings, mounted in the central aperture 54.

Figure 3:
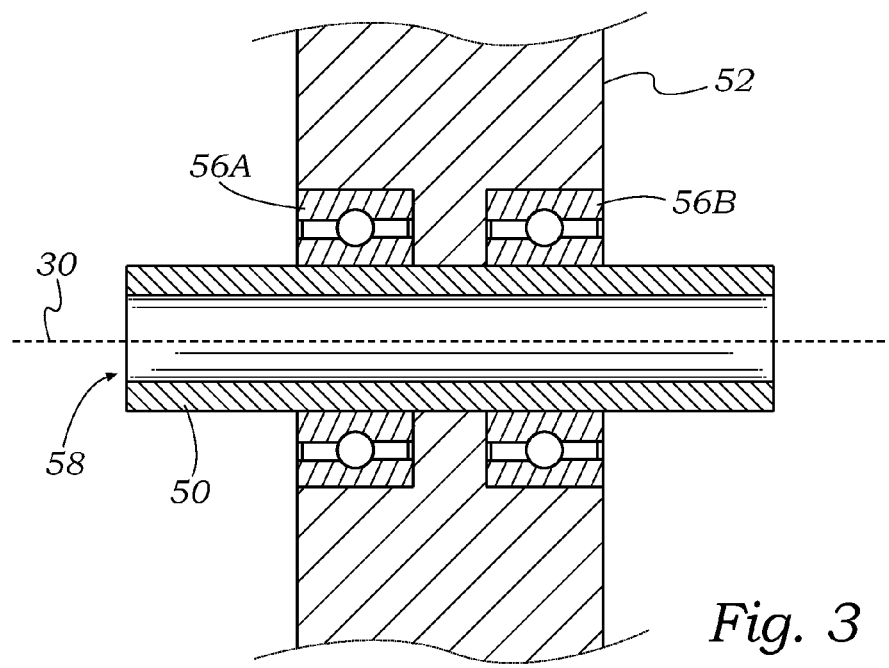
FIG. 3 is a sectional view of the spinner assembly and the associated tube of FIG. 2 in assembly and as indicated by lines 3-3 in FIG. 2.

FIG. 3 is a sectional view of the spinner assembly 12 and the associated tube 50 of FIG. 2 in assembly and as indicated in FIG. 2.

Figure 4:
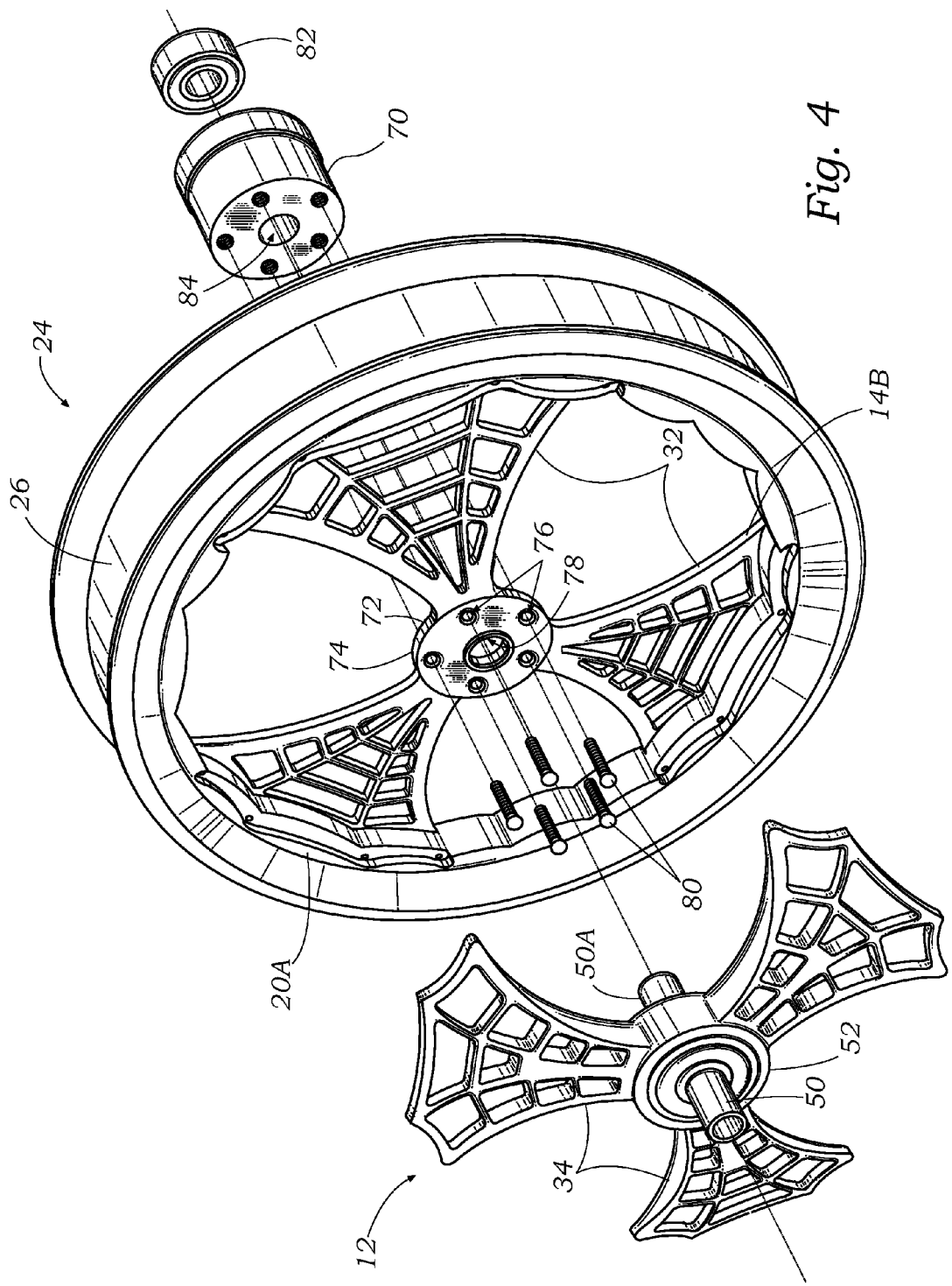
FIG. 4 is an exploded view of a portion of the wheel of FIG. 1 depicting a step of an assembly method wherein the spinner assembly is rotatably mounted to one of the supports via the tube.
Figure 5:
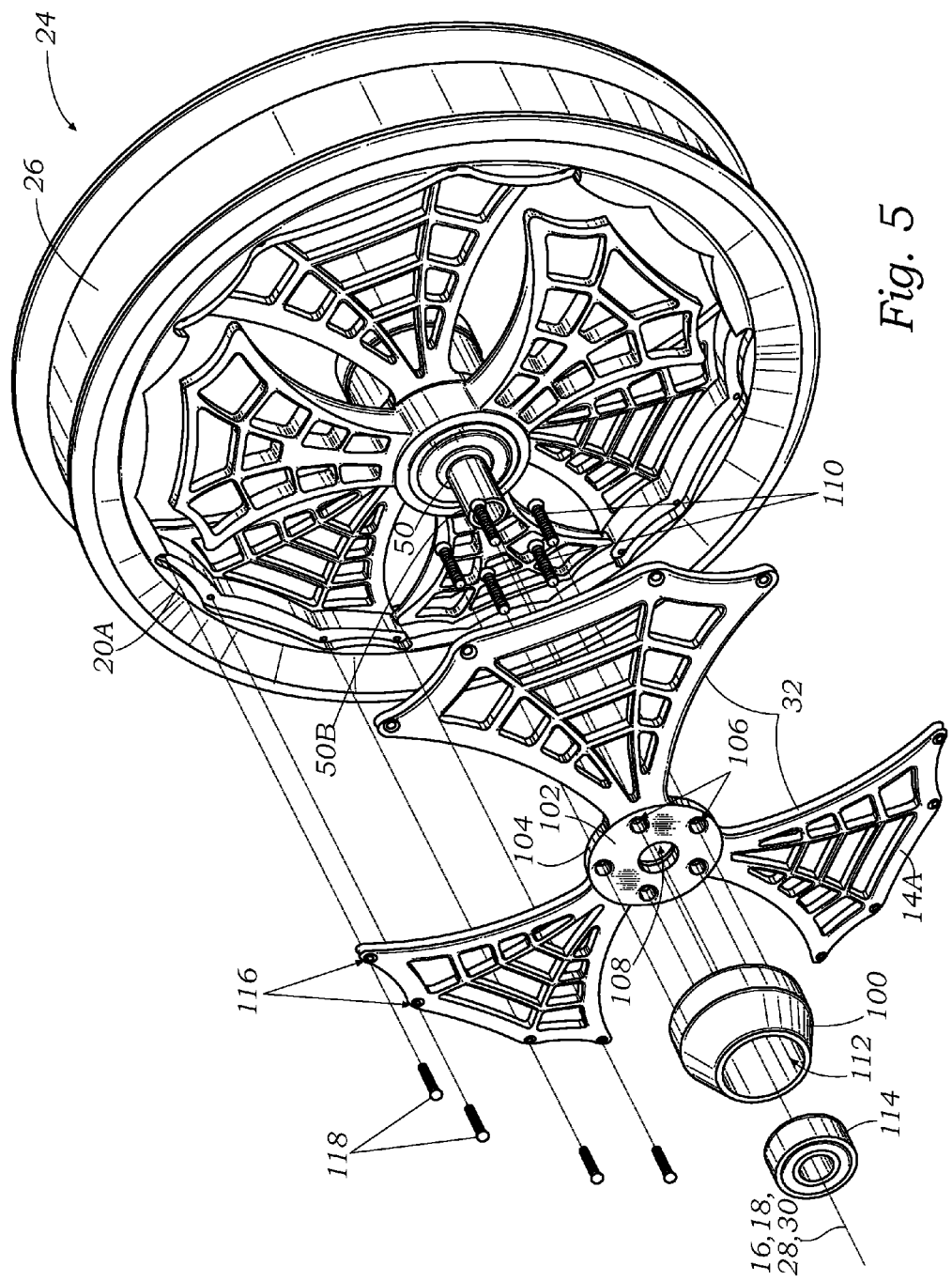
FIG. 5 is an exploded view of a portion of the wheel of FIG. 1 depicting another step of the assembly method wherein the other support is connected a side surface of a rim such that the spinner assembly is rotatably mounted between the supports.

FIGS. 4 and 5 will now be used to illustrate one embodiment of a method for assembling the wheel 10 of FIG. 1. In FIG. 4, the second support 14B has already been connected (e.g., bolted) to the corresponding side surface of the rim 24. A hub extension 70 is connected to an outer surface 72 of a central hub portion 74 of the second support 14B. As described above, the second support 14B includes multiple spokes 32 extending from the central hub portion 74. In the embodiment of FIG. 4, the central hub portion 74 has five holes 76 surrounding a central aperture 78. Five bolts 80 are used to connect a side of the hub extension 70 to the outer surface 72 of a central hub portion 74 of the second support 14B. While bolts 80 are illustrated in the present embodiment, additional connectors such as dowels (not shown) may also be added to increase the strength of the connection, as is well known in the art.

Connected to the central hub portion 74 of the second support 14B, the hub extension 70 forms a part of the second support 14B. The hub extension 70 has a hole 84 passing therethrough. The tube 50 has two opposed ends, and mouth of the hole 84 in the side of the hub extension 70 connected to the central hub portion 74 of the second support 14B is dimensioned to receive an end 50A of the tube 50. It is noted that the hub extension 70 may be adapted to receive a drive belt, a drive pulley, and/or a disk brake rotor.

FIG. 4 is an exploded view of a portion of the wheel 10 of FIG. 1 depicting a step of the assembly method wherein the spinner assembly 12 is rotatably mounted to the second support 14B via the tube 50 such the tube 50 passes through the central aperture 54 of the spinner assembly 12 (see FIG. 2) and the end 50A of the tube 50 is received in the second support 14B. In FIG. 4 the tube 50 has been passed through the central openings of the ball bearings 56A and 56B mounted in the central aperture 54 of the spinner assembly 12. The end 50A of the tube 50 is passed through the central aperture 78 of the second support 14B and into the mouth of the hole 84 in the side of the hub extension 70 of the second support 14B. In the embodiment of FIG. 4 a ball bearing 82 is mounted in a mouth of the hole 84 in a side of the hub extension 70 opposite the side connected to the central hub portion 74 of the second support 14B.

FIG. 5 is an exploded view of a portion of the wheel 10 of FIG. 1 depicting another step of the assembly method wherein the first support 14A is connected the side surface 20A of the rim 24 such that an end 50B of the tube 50, opposite the end 50A of FIG. 4, is received in the first support 14A. A hub extension 100 is connected to an outer surface 102 of a central hub portion 104 of the first support 14A. As described above, the first support 14A includes multiple spokes 32 extending from the central hub portion 104. In the embodiment of FIG. 5, the central hub portion 104 has five holes 106 surrounding a central aperture 108. Five bolts 110 are used to connect a side of the hub extension 100 to the outer surface 102 of the central hub portion 104 of the first support 14A.

Connected to the central hub portion 104 of the first support 14A, the hub extension 100 forms a part of the first support 14A. The hub extension 100 has a hole 112 passing therethrough. A mouth of the hole 112 in the side of the hub extension 100 connected to the central hub portion 104 of the first support 14A is dimensioned to receive the end 50B of the tube 50.

The end 50B of the tube 50 is passed through the central aperture 108 of the first support 14A and into the mouth of the hole 112 in the side of the hub extension 100. In the embodiment of FIG. 5 a ball bearing 114 is mounted in a mouth of the hole 112 in a side of the hub extension 100 opposite the side connected to the central hub portion 104 of the first support 14A.

As described above, each of the spokes 32 is adapted for connection to the side surface 20A of the rim 24. In the embodiment of FIG. 5, each of the spokes 32 has 4 holes 116 along an outer edge. As described in more detail below, four holes extend through the rim 24 between the side surface 20A and an opposite side surface for each of the spokes 32, and an internally threaded tube is inserted into each of the holes. To connect one of the spokes 32 to the side surface 20A of the rim 24, each of four bolts 118 is passed through a hole in the spoke 32 and threaded into a corresponding one of the internally threaded tubes. After the spokes 32 of the first support 14A are connected to the side surface 20A of the rim 24, the spinner assembly 12 is rotatably mounted between the supports 14A and 14B.

Figure 6:
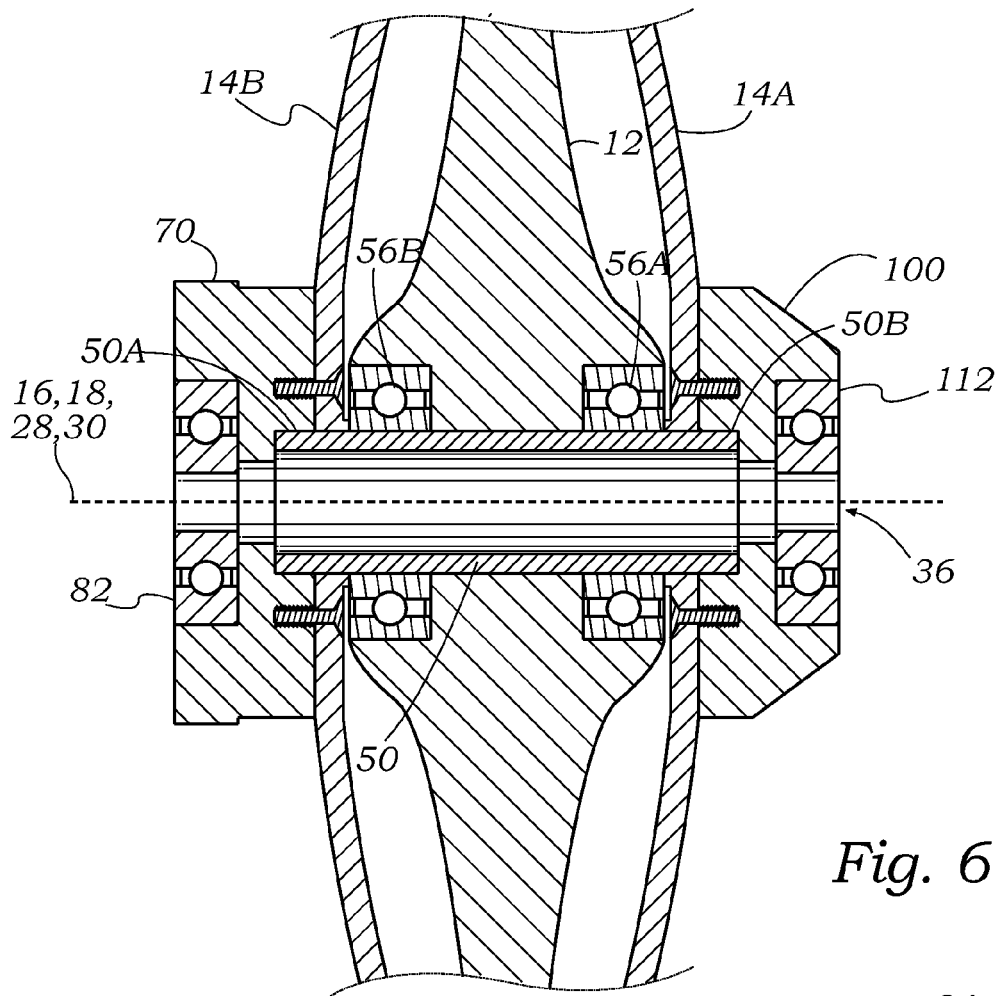
FIG. 6 is a sectional view of a central portion of the wheel of FIG. 1.

FIG. 6 is a sectional view of a central portion of the wheel 10 of FIG. 1, illustrating how the various components fit together in final assembly.

FIG. 7 is a sectional view of a portion of the wheel 10 as indicated by lines 7-7 in FIG. 1. FIG. 7 illustrates the above described mechanism used to connect the spokes 32 of the supports 14A and 14B to the respective side surfaces of the rim 24 of FIG. 1. In FIG. 7 the side surface 20A has a step 140 shaped to receive and frictionally engage an outer edge of a spoke 32 of the first support 14A, and the opposite side surface, labeled 20B, has a step 142 shaped to receive an outer edge of another spoke 32 of the second support 14B. A hole extends through the rim 24 between the side surfaces 20A and 20B, and an internally threaded tube 144 is positioned in the hole. To connect the spoke 32 of the first support 14A to the side surface 20A, a bolt 146 is passed through a corresponding hole in the spoke 32 and threaded into an end of the internally threaded tube 144. To connect the spoke 32 of the second support 14B to the side surface 20B, a bolt 148 is passed through a corresponding hole in the spoke 32 and threaded into an opposite end of the internally threaded tube 144. After being threaded into opposite ends of the internally threaded tube 144, the bolts 146 and 148 may be tightened simultaneously.

It is noted that an outer surface 150 of the spoke 32 of the first support 14A may contact a corresponding surface 152 of the side surface 20A, and an outer surface 154 of the spoke 32 of the second support 14B may contact a corresponding surface 156 of the side surface 20B, such that the tube 144 and the bolts 146 and 148 are not subjected to significant shear forces during use of the wheel 10. It is also noted that although bearings 82 (FIGS. 4 and 6) and 114 (FIGS. 5 and 6) are ball bearings in the embodiments shown and described, other types of bearings may also be used.

While FIG. 7 illustrates one method of attaching the supports 14A and 14B, those skilled in the art will recognize that alternative attachment mechanisms may also be used, and such alternatives should be considered within the scope of the claimed invention.

Figure 8:
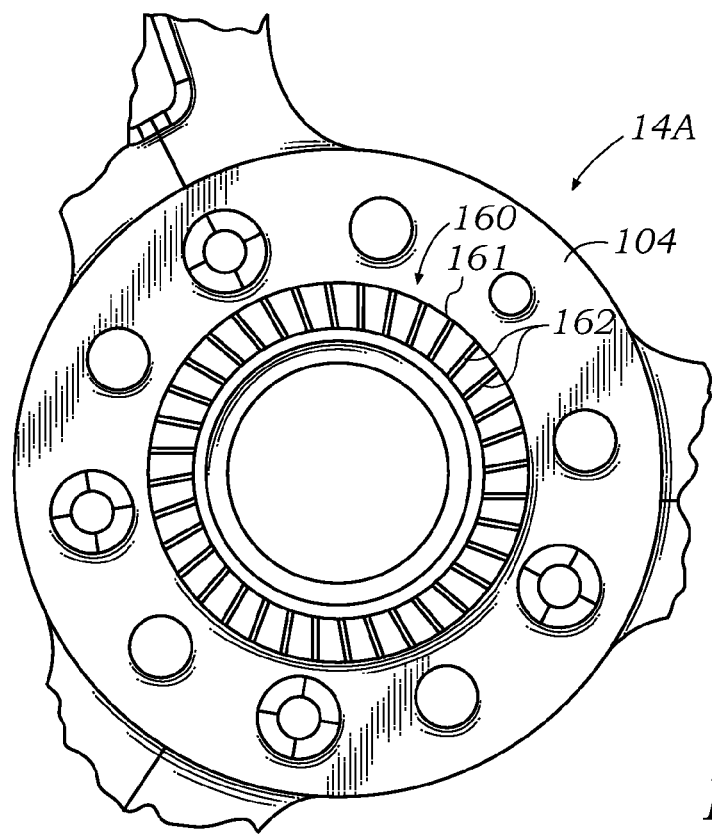
FIG. 8 is a front elevational view of an alternative embodiment of a central hub portion of one of the pair of supports, illustrating a water seal.
Figure 9:
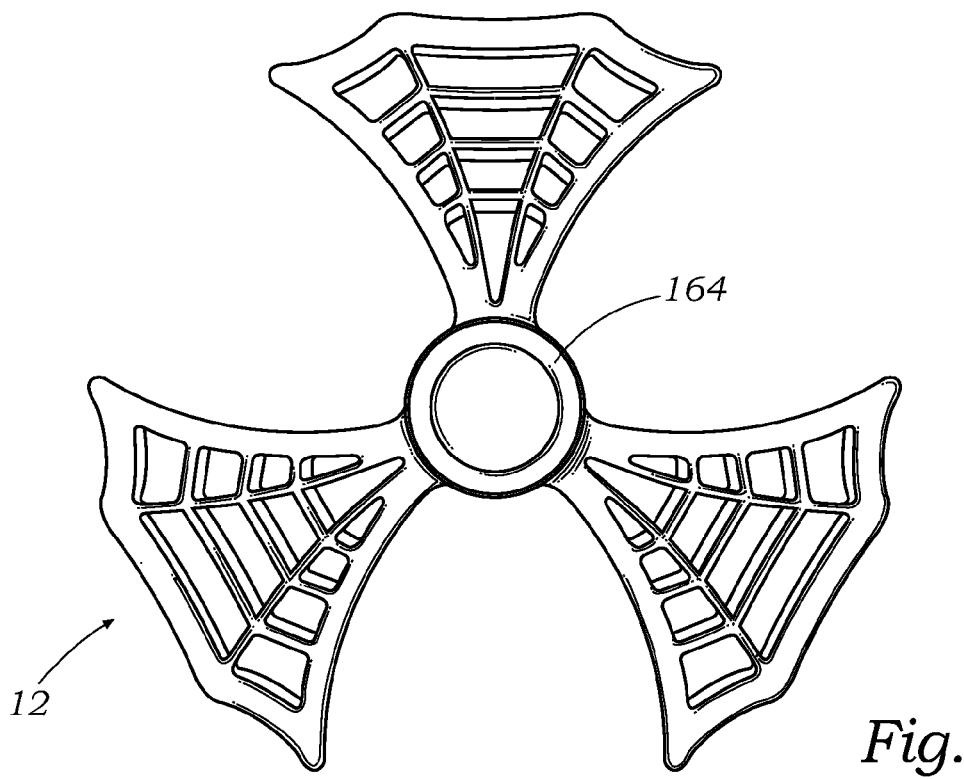
FIG. 9 is a side elevational view of an alternative embodiment of the spinner assembly adapted for use with the water seal shown in FIG. 8.

FIG. 8 is a front elevational view of an alternative embodiment of a central hub portion 104 of one of the pair of supports 14A, illustrating a water seal 160. The water seal 160 may include a raised portion 161 that is raised about $60/1000$ inch, and a plurality of angled slots 162 through the raised portion 161. The water seal 160 is adapted to integrate with a channel 164 of the spinner assembly 12, as shown in FIG. 9. The raised portion 161 integrates with the channel 164 to exclude water and other contamination, and the angled slots 162 function to sling water away from the interior of the spinner assembly 12.

Figure 10:
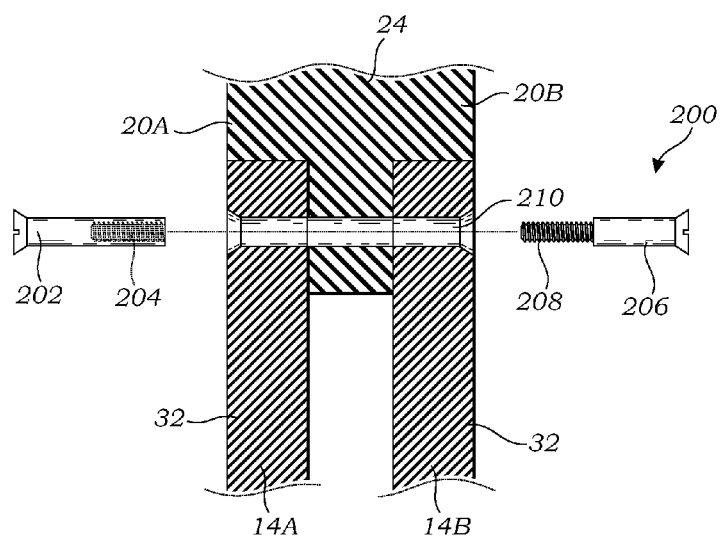
FIG. 10 is a sectional view similar to FIG. 7, illustrating an alternative embodiment of the mechanism used to connect the spokes of the supports to the respective side surfaces of the rim, wherein the mechanism includes a barrel bolt assembly.

FIG. 10 is a sectional view similar to FIG. 7, illustrating an alternative embodiment of the mechanism 200 used to connect the spokes 32 of the supports 14A and 14B to the respective side surfaces 20A and 20B of the rim 24. In this embodiment, the mechanism 200 is a barrel bolt assembly that includes a bolt 202 having an internally threaded portion 204, and a screw 206 having an externally threaded portion 208 adapted to threadedly engage the internally threaded portion 204. Similar barrel bolt assemblies are often referred to as "sex bolts." The barrel bolt assembly 200 is positioned through a hole 210 for locking the spokes 32 onto the rim 24.

In another embodiment, shown in FIGS. 11-14, the wheel 10 includes a spinner locking mechanism 220 for locking the spinner assembly 12 with one or more of the spokes 32 for locking the spinner assembly 12 in place and preventing rotation.

Figure 11:
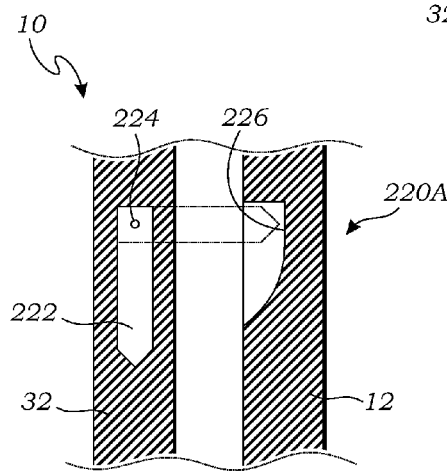
FIG. 11 is a sectional view of one embodiment of a spinner locking mechanism.

FIG. 11 is a sectional view of one embodiment of a spinner locking mechanism 220. In this embodiment, the spinner locking mechanism 220 includes a locking arm 222 pivotally mounted on a pivot 224 of the spoke 32. The locking arm 222 pivots between a first orientation, wherein the locking arm 222 does not contact the spinner assembly 12, and a second orientation, wherein the locking arm 222 engages a recess 226 in the spinner assembly 12.

Figure 12:
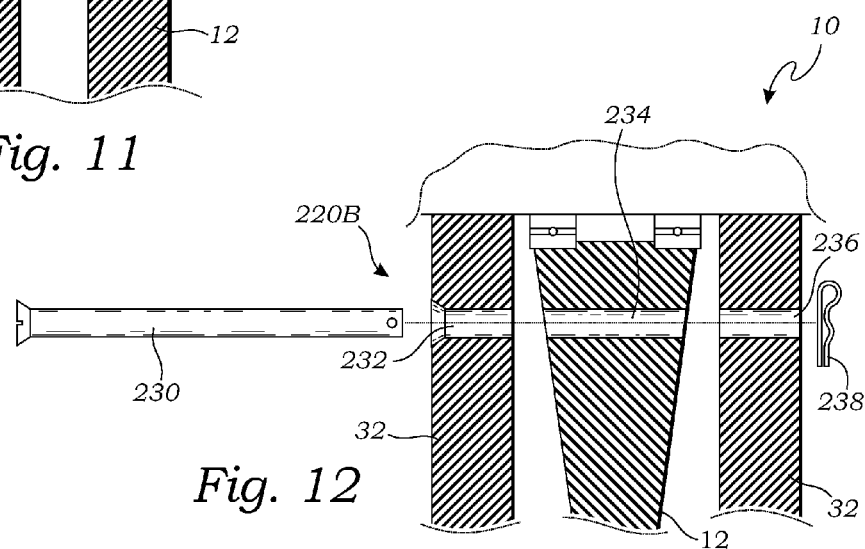
FIG. 12 is a sectional view of a second embodiment of the spinner locking mechanism.

FIG. 12 is a sectional view of a second embodiment of the spinner locking mechanism 220, wherein the spinner locking mechanism 220 includes a locking bolt 230 adapted to lock the spinner assembly 12 with the spoke 32. In this embodiment, the locking bolt 230 is inserted through a first aperture 232 in one of the spokes 32, thorough a second aperture 234 in the spinner assembly 12, and through a third aperture 236 of the other of the spokes 32. A pin 238 or similar mechanism is used to lock the locking bolt 230 in place.

As shown in FIGS. 13 and 14, the spinner locking mechanism 220 may include multiple locking bolts 230. In alternative embodiments, the spinner locking mechanism 220 may include only one element. FIG. 13 illustrates the spinner locking mechanism 220 being used to lock the spinner assembly 12 in a first position, wherein the spinner assembly 12 is positioned between the spokes 32 so that they do not significantly overlap. FIG. 14 is a side elevational view of the spinner locking mechanism 220 being used to lock the spinner assembly 12 in a second position, wherein the spinner assembly 12 is positioned behind the spokes 32 so that they overlap. This enables the user of the wheel 10 to determine, to some extent, the shape and design of the wheel 10.

FIG. 15 is a sectional view similar to FIG. 7, illustrating a valve assembly 240 that is adapted to be positioned through the rim 24. The valve assembly 240 includes a stem 242 that is positioned within a conduit 244 that extends through one of the spokes 32 and through the rim 24 to an inner surface 245 of the rim. A valve 246 is operably positioned within the stem 242, and a cap 248 is adapted to threadedly engage the stem 242. The other of the spokes 32 may include an internally threaded bore 252 so that a false screw 250 can be mounted on the other of the spokes 32 to simulate the other screws of the wheel 10.

Figure 16:
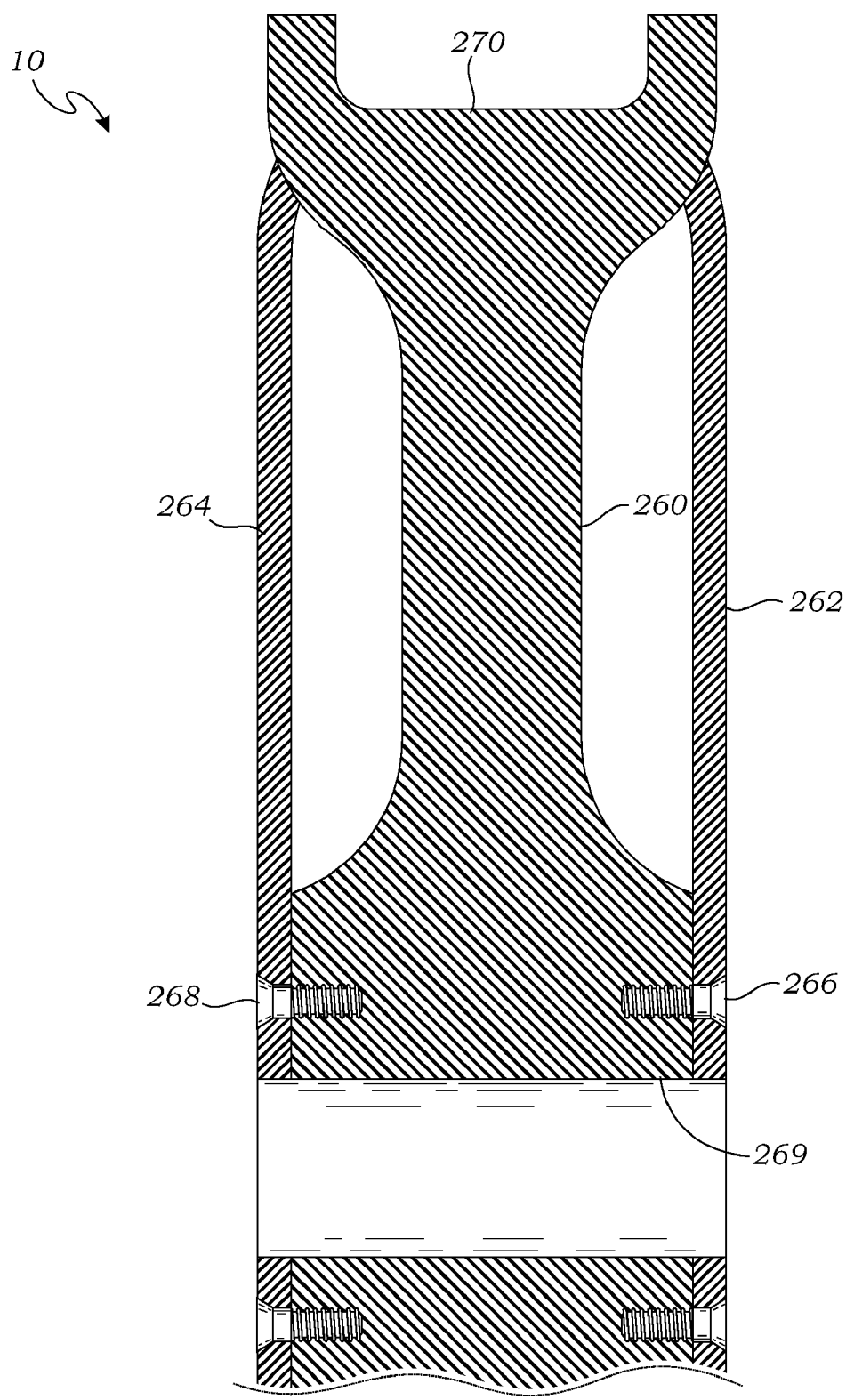
FIG. 16 is a sectional view similar to FIG. 6, illustrating an alternative embodiment wherein the wheel includes a center portion that is not adapted to spin relative to an outer housing.

FIG. 16 is a sectional view similar to FIG. 6, illustrating an alternative embodiment wherein the wheel 10 includes a center portion 260 that is not adapted to spin relative to an outer encapsulations 262 and 264. The outer encapsulations 262 and 264 may be mounted on a standard hub 269 with bolts 266 and 268, or similar mounting elements. The center portion 260 extends to a standard rim 270. This embodiment is important because it maintains the unique 3-D appearance of the invention, albeit without the spinning feature of the inner portion. The outer encapsulations 262 and 264 may be removed to facilitate painting, electroplating, etching, or otherwise embellishing the center portion 260.

Figure 17:
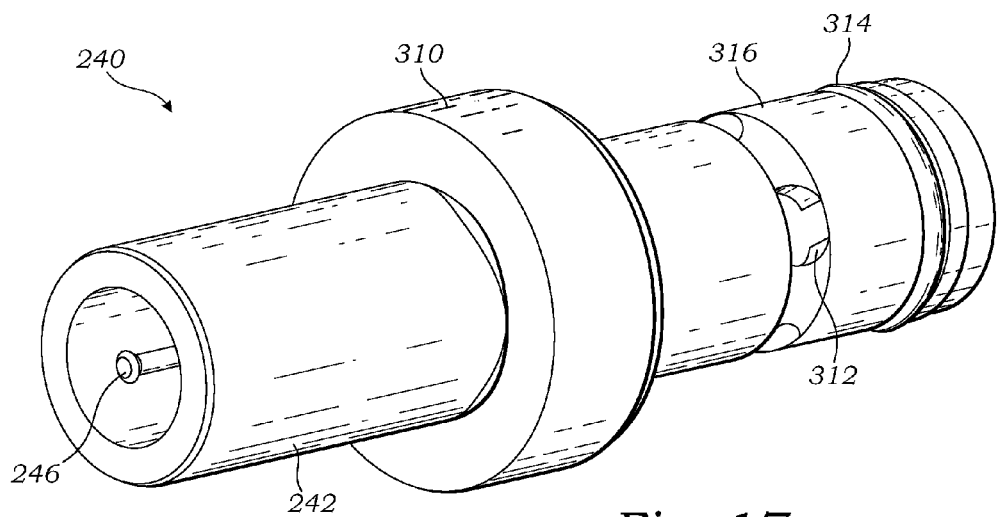
FIG. 17 is one perspective view of another embodiment of the valve assembly.
Figure 18:
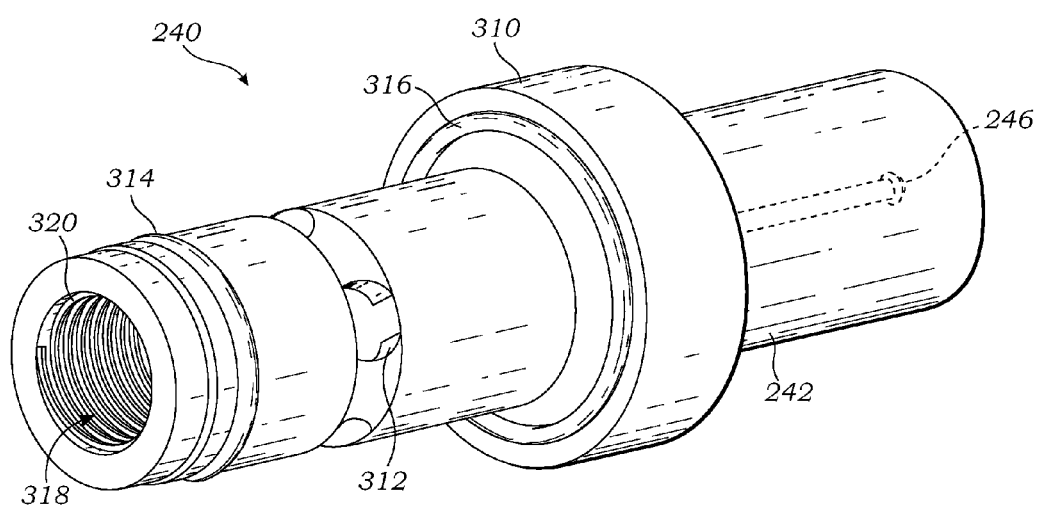
FIG. 18 is another perspective view of the valve assembly of FIG. 17.

FIGS. 17 and 18 are perspective views of another embodiment of the valve assembly 240. As illustrated in FIGS. 17 and 18, the valve assembly 240 is shaped and adapted to engage the wheel described above for inflating the tire (not shown). As illustrated in FIGS. 17 and 18, the valve assembly 240 may include the valve 246 operably positioned within the stem 242 for regulating airflow therethrough, as is well known in the art. The valve assembly 240 may also include a middle portion 310 that is adapted to abut the rim 24, and an engaging element 318 for engaging the valve assembly 240 through the spoke 32 and into the rim 24.

The valve assembly 240 may further include an airflow aperture 312 or apertures that communicate with the stem 242. A first sealing element 314 and a second sealing element 316 are adapted to seal on either side of the conduit 244 so that airflow from the airflow aperture 312 is restricted to the conduit 244. The first and second sealing elements 314 may be, for example, O-rings or similar sealing structures known in the art.

The engaging element 318 may be, for example, a cylindrical chamber having an internally threaded surface 320 that is adapted to threadedly engage the bolt 118. As the bolt 118 is tightened, it draws the valve assembly 240 into the rim 24 until the second sealing element 316 and the middle portion 310 abuts the spoke mating element 304 of the rim 24.

In alternative embodiments, the engaging element may be an externally threaded surface (not shown) of the valve assembly 240 for threadedly engaging the spoke 32 and/or the rim 24. Additional embodiments may be devised by those skilled in the art, and such alternatives should be considered within the scope of the invention.

Figure 19:
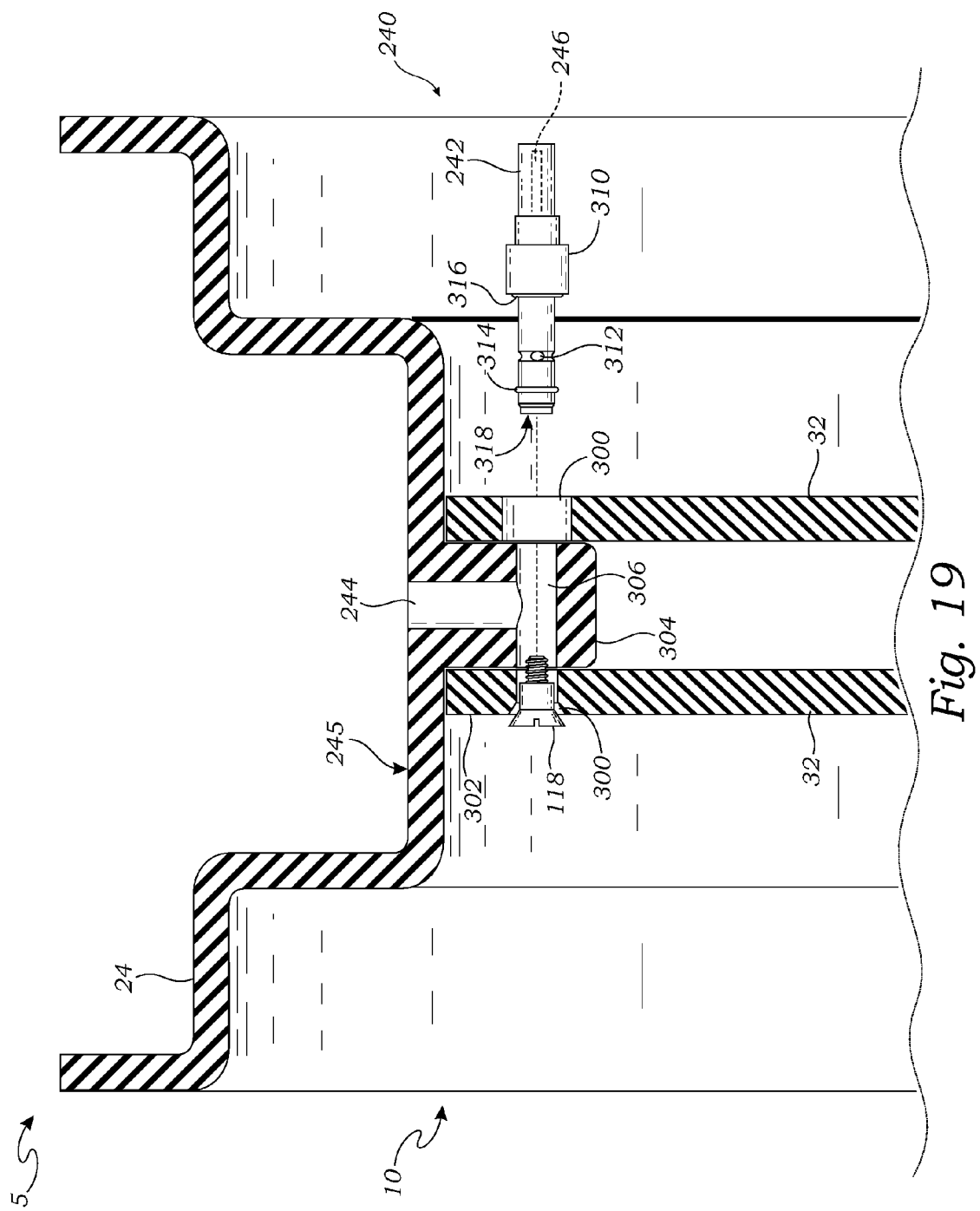
FIG. 19 is a sectional view similar to FIG. 15, illustrating how the valve assembly of FIG. 17 is positioned into the rim.

FIG. 19 is a sectional view similar to FIG. 15, illustrating a combination wheel and valve assembly 5 that illustrates how the valve assembly 240 of FIGS. 17 and 18 is positioned in the rim 24 to form the combination 5. As described above, the valve assembly 240 is adapted to be positioned through one of the spokes 32 and into the rim 24.

As illustrated in FIGS. 17-19, each of the plurality of spokes 32 includes at least one aperture 300 through a rim-end 302 thereof. The rim 24 has the inner surface 245 and a spoke mating element 304 opposite the inner surface 245. The spoke mating element 304 is adapted to abut the spokes 32 such that the rim 24 is supported by the spokes 32, and while one possible embodiment is illustrated, alternative structures may also be utilized.

A plurality of through-holes 306 extending through the spoke mating element 304 of the rim 24 so that the spokes 32 may be bolted or otherwise fastened to the rim 24. The plurality of through-holes 306 are spaced around the rim 24, and may be evenly spaced, spaced in groups, or even spaced irregularly if this design or arrangement is desired. A plurality of bolts 118 are shaped to fit through the aperture 300 of the rim-end 302 of each of the spokes 32, and into one of the plurality of through-holes 306 of the spoke mating element 304, to threadedly engage the valve assembly 240. The structure of the bolts 118 may vary, as described above.

Furthermore, while the though-holes 306 are illustrated as extending entirely through the spoke mating element 304, they may alternatively be two bores, or an equivalent structure, if the valve assembly 240 and bolt 118 threadedly engage the rim 24 and/or spoke 32.

As illustrated in FIG. 19, a conduit 244 extends through the inner surface 245 of the rim 24 to one of the through-holes 306 of the rim 24. The valve assembly 240 is shaped to extend through the aperture 300 of one of the spokes 32 and engage the through-hole 306 having the conduit 244, thereby enabling fluid (air) flow through the valve assembly 240, and the conduit 244, to the inner surface 245 of the rim 24, for inflating the tire (not shown).

The terminology used in the specification provided above is hereby defined to include similar and/or equivalent terms, and/or alternative embodiments that would be considered obvious to one skilled in the art given the teachings of the present patent application. Additionally, the words "a," "an," and "one" are defined to include one or more of the referenced item unless specifically stated otherwise. Also, the terms "have," "include," "contain," and similar terms are defined to mean "comprising" unless specifically stated otherwise.

While the invention has been described with reference to at least one embodiment, it is to be clearly understood by those skilled in the art that the invention is not limited thereto. Rather, the scope of the invention is to be interpreted only in conjunction with the appended claims.

What is claimed is:

1. A combination wheel and valve assembly, comprising:
a plurality of spokes each having at least one aperture through a rim-end thereof;
a rim having an inner surface and a spoke mating element opposite the inner surface;
a plurality of through-holes extending through the spoke mating element of the rim, the plurality of through-holes being spaced around the rim;
a plurality of bolts shaped to fit through the aperture of the rim-end of each of the spokes, and into one of the plurality of through-holes of the spoke mating element, to fasten each spoke to the rim;
a conduit extending through the inner surface of the rim to one of the through-holes of the rim;
a valve assembly shaped to extend through the aperture of one of the spokes and through the one of the through-holes having the conduit, the valve assembly having a valve and a stem that extend out through the aperture of the one of the spokes;
an airflow aperture of the valve assembly being operably connected to the valve and the stem, and being positioned within the through-hole and adjacent the conduit; and
a first sealing element on one side of the conduit and a second sealing element on the other side of the conduit such that together they seal on either side of the conduit so that airflow from the airflow aperture is restricted to the conduit, thereby enabling fluid flow through the valve assembly, through the conduit, to the inner surface of the rim.

2. A combination wheel and valve assembly, comprising:
a plurality of spokes each having at least one aperture through a rim-end thereof;
a rim having an inner surface and a spoke mating element opposite the inner surface;
a plurality of through-holes extending through the spoke mating element of the rim, the plurality of through-holes being spaced around the rim;
a plurality of bolts shaped to fit through the aperture of the rim-end of each of the spokes, and into one of the plurality of through-holes of the spoke mating element, to fasten each spoke to the rim;
a conduit extending through the inner surface of the rim to one of the through-holes of the rim;
a valve assembly shaped to extend through the aperture of one of the spokes and through the one of the through-holes having the conduit, the valve assembly having a valve and a stem that extend out through the aperture of the one of the spokes;
an airflow aperture of the valve assembly being operably connected to the valve and the stem, and being positioned within the through-hole and adjacent the conduit;
a first sealing element on one side of the conduit and a second sealing element on the other side of the conduit such that together they seal on either side of the conduit so that airflow from the airflow aperture is restricted to the conduit, thereby enabling fluid flow through the valve assembly, through the conduit, to the inner surface of the rim; and
an engaging element of the valve assembly opposite the valve and the stem;
a middle portion of the valve assembly between the airflow aperture and the valve;
a bolt shaped to engage the engaging element of the valve assembly such that the second sealing element and a middle portion of the valve assembly abut the spoke mating element of the rim.

* * * * *